Figure 1:
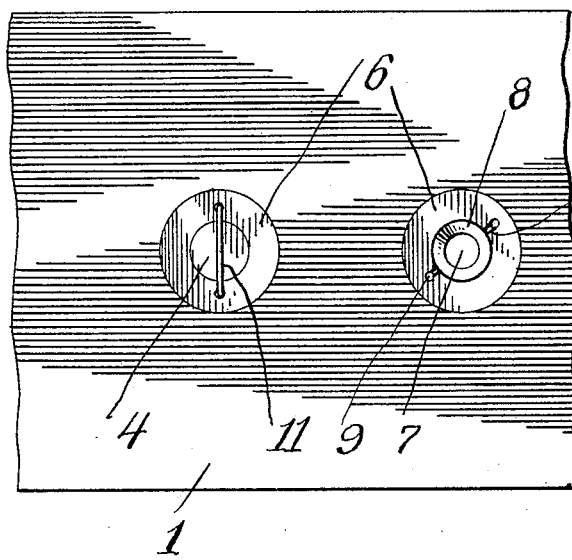

J. THOMAS.
SCREW LOCK.
APPLICATION FILED AUG. 23, 1912.

1,050,084.

Patented Jan. 7, 1913.

WITNESSES

INVENTOR
John Thomas

ATTORNEYS

COLUMBIA PLANOGRAPH CO., WASHINGTON, D. C.

UNITED STATES PATENT OFFICE.

JOHN THOMAS, OF WINNIPEG, MANITOBA, CANADA, ASSIGNOR OF ONE-HALF TO ANNA PANCZUK, OF WINNIPEG, CANADA.

SCREW-LOCK.

1,050,084.  Specification of Letters Patent.  Patented Jan. 7, 1913.

Application filed August 23, 1912. Serial No. 716,780.

*To all whom it may concern:*

Be it known that I, JOHN THOMAS, a subject of the Emperor of Austria-Hungary, residing at Winnipeg, Manitoba, Canada, have invented certain new and useful Improvements in Screw-Locks, of which the following is a specification, reference being had therein to the accompanying drawing.

This invention relates to a screw lock, and the primary object of my invention is to provide novel means, as hereinafter set forth, for locking a screw whereby the same cannot become loose or accidentally displaced.

A further object of this invention is to provide a simple and inexpensive screw locking device that is strong and durable and highly efficient for the purposes for which it is intended.

I attain the above objects by a mechanical construction that will be hereinafter specifically described and then claimed, and reference will now be had to the drawing, wherein there are illustrated the preferred embodiments of my invention, but it is to be understood that the structural elements are susceptible to such changes as fall within the scope of the appended claim.

Figure 2:
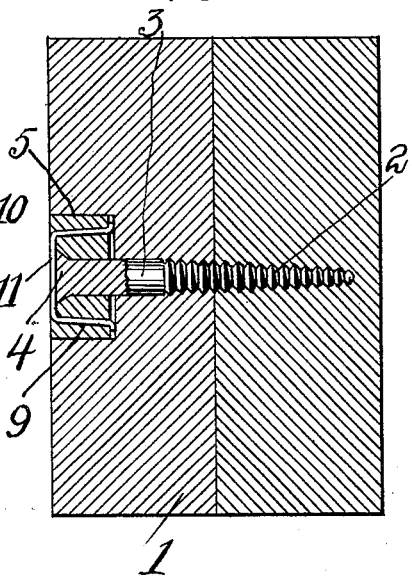
Figure 3:
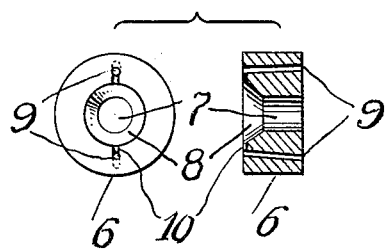
Figure 5:
Figure 4:
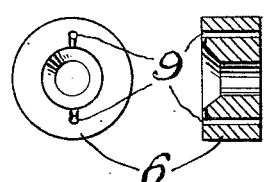

In the drawing:—Figure 1 is a front elevation of a piece of material provided with a screw lock. Fig. 2 is a cross sectional view of the same. Fig. 3 illustrates detailed views of the preferred form of washer forming part of the lock. Fig. 4 illustrates details of a modified form of washer. Fig. 5 is a perspective view of the detached locking staple, and Fig. 6 is a front elevation of a further modified form of washer.

The reference numeral 1 denotes, by the way of an example, pieces of material connected by a screw 2 having a shank 3 and a slotted head 4. The piece of material that receives the shank 3 is provided with an annular recess or socket 5 for a washer 6 that is of a diameter slightly greater than the recess 5, whereby it will be necessary to drive or force a washer into the recess in order that said washer will be permanently held therein against rotation as the screw 2 is screwed into the material. The washer 6 is of a less depth than the recess 5, as shown in Fig. 2 and is provided with a concentric opening 7 to receive the shank 3 of the screw, said opening having the outer end thereof enlarged to provide a seat 8 for the head 4 of the screw. The washer 6 has diametrically opposed diverging openings 9 and the outer side of a washer has diametrically opposed alining grooves 10 establishing communication between the seat 8 and the openings 9.

After the head 4 of the screw has been seated in the washer 6, a malleable staple 11, preferably made of wire is driven into the openings 9 whereby the staple will engage in the slot of the screw head 4 and have the ends of said staple clenched or bent between the inner face of the washer and the bottom of the recess 5, as shown in Fig. 2. With the ends of the staple clenched, the staple cannot become accidentally displaced and with the staple engaging in the slotted head 4 of the screw, said screw cannot rotate.

Figure 6:
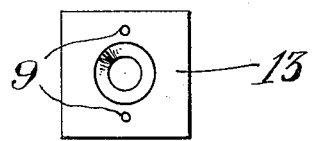

In Fig. 4, the openings 9 of the washer are in parallelism, while in Fig. 6 the washer is rectangular or provided with flat faces 13. This form of washer can be mounted in a rectangular recess and the flat faces prevent the washer from rotating.

What I claim is:—

In a screw locking device, the combination with a piece of material having a socket formed therein, and a screw mounted in said piece of material, of a washer mounted in said socket and of less depth than said socket, said washer having a seat formed therein to receive the slotted head of said screw, said washer having diametrically opposed openings formed therein, and a malleable staple extending through the openings of said washer and engaging in the slotted head of said screw with the ends of said staple clenched against the inner face of said washer.

In testimony whereof I affix my signature in the presence of two witnesses.

JOHN THOMAS.

Witnesses:
 MAX H. SROLOVITZ,
 KATHERINE ERRETT.

---

Copies of this patent may be obtained for five cents each, by addressing the "Commissioner of Patents, Washington, D. C."